United States Patent [19]

Mohn et al.

[11] 4,259,833
[45] Apr. 7, 1981

[54] CROP CATCHING FLOOR FOR HARVESTING MACHINES

[76] Inventors: Donald R. Mohn, Star Rte., Flaxville, Mont. 59222; Herbert D. Mohn, 434 SE. 45th Ave., Portland, Oreg. 97215

[21] Appl. No.: 56,098

[22] Filed: Jul. 9, 1979

[51] Int. Cl.³ .................................... A01D 46/00
[52] U.S. Cl. ................................ 56/330; 56/329
[58] Field of Search ............................ 56/329, 330

[56] References Cited

U.S. PATENT DOCUMENTS

| | | | |
|---|---|---|---|
| 3,229,453 | 1/1966 | Harrett | 56/330 |
| 3,255,578 | 6/1966 | Perties | 56/330 |
| 3,538,694 | 11/1970 | Holloway | 56/330 |
| 3,579,971 | 5/1971 | Sagouspe et al. | 56/330 |
| 3,601,965 | 8/1971 | Kaessbohrer et al. | 56/330 |
| 3,685,266 | 8/1972 | Mohn et al. | 56/330 |
| 3,866,401 | 2/1975 | Claxton et al. | 56/330 |
| 4,177,891 | 12/1979 | Delfosse | 56/330 |

Primary Examiner—Paul J. Hirsch
Attorney, Agent, or Firm—Eugene M. Eckelman

[57] ABSTRACT

A pair of floor panels extend inwardly from the opposite sides of a harvesting machine in an inclined relation and have an overlapping relation centrally of the machine. Each panel has a resilient membrane supported on a plurality of longitudinally spaced, spring-pressed, inclined pivotal arms. The membrane portions are arranged to move past trunk portions of vines in close association and catch crop articles falling by gravity as a result of shaker apparatus or the like on an upper portion of the machine. The flexible membrane has upwardly arched portions in the area between the support arms, the arched portions on opposite sides being laterally aligned and in partially overlapping relation. The support arms have lateral adjustment as well as adjustment of their inclination. Adjustment apparatus is also provided to vary the tension of the membrane portions.

6 Claims, 9 Drawing Figures

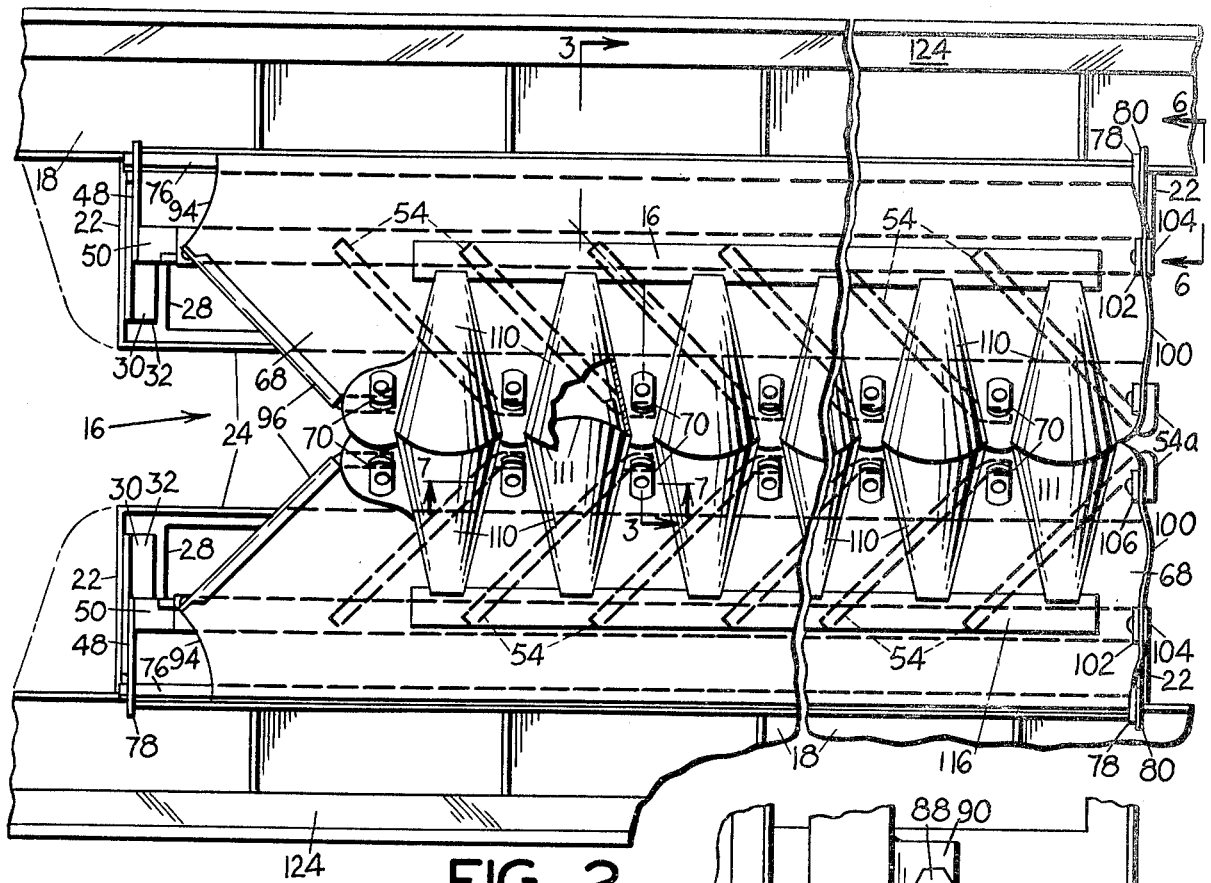
FIG. 2
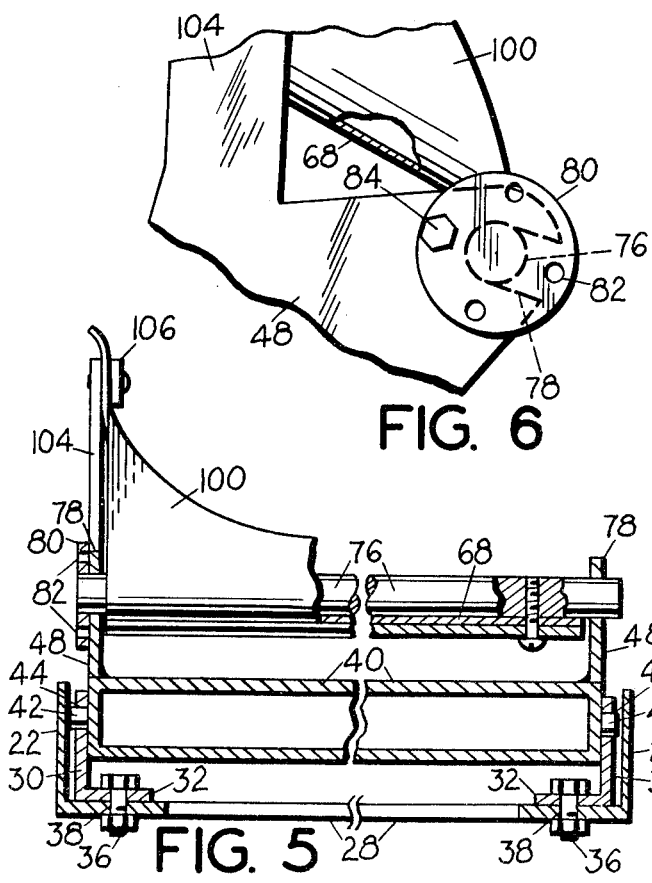
FIG. 6
FIG. 5
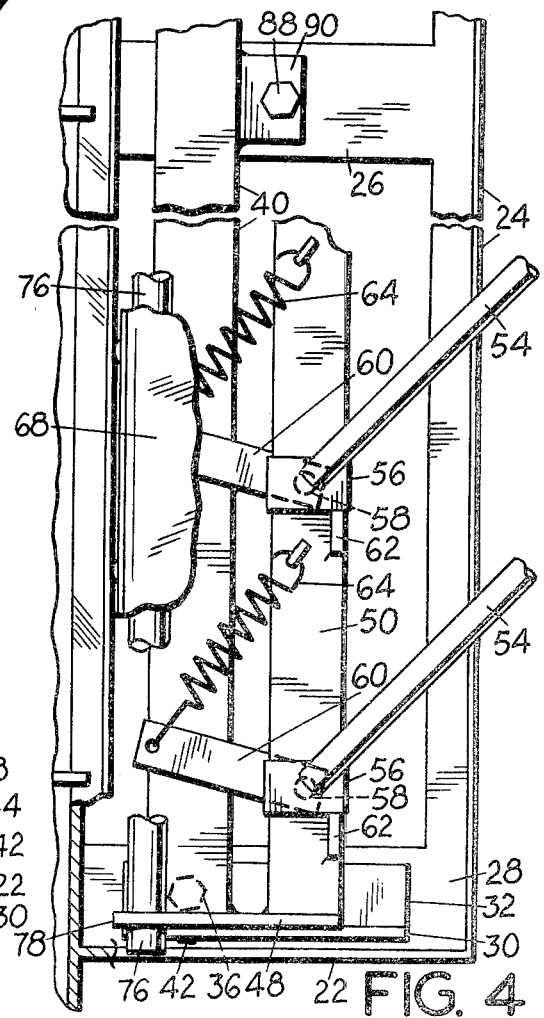
FIG. 4

CROP CATCHING FLOOR FOR HARVESTING MACHINES

BACKGROUND OF THE INVENTION

This invention relates to new and useful improvements in crop catching floors for harvesting machines.

Harvesting machines heretofore employed have used upper crop removing mechanism, such as shaker apparatus, arranged to straddle vines and the like for loosening the crop articles therefrom. These machines employ catching floors below the crop removing means to catch the crop articles falling by gravity. One type of floor that is used which will move through the trunk portion of the vines as the machine straddles the vines includes a plurality of pivotal, overlapping metal plates extending inwardly from each side. Applicants have found that these metal type plates have inherent disadvantages. One such disadvantage is that crop articles are frequently damaged because of the hard surface presented by the metal. Another disadvantage is that these metal plates damage the trunks of the vines as they thread past the vines. Furthermore, the overlapping plates due to their thick edges not only damage the crop articles as they pivot around the trunks of the vines but also they push crop articles off at their angled edges.

SUMMARY OF THE INVENTION

According to the present invention and forming a primary objective thereof, a crop catching floor for harvesting machines is provided having a structure that not only moves freely past the trunks of vines but also efficiently catches falling crop articles with little or no damage thereto.

In carrying out such objective, a crop catching floor is provided which employs a pair of floor panels extending inwardly from opposite side frames on the machine and each comprising a resilient membrane and spring pressed support means extending under the membranes in an arrangement such that the membrane and support means are movable apart against the spring pressure operating on the support arms whereby to pass by trunk portions of vines in close association therewith and catch crop articles. Adjustment means are provided to vary central overlapping relation of the floor panels at the center of the machine and also to vary the inclined relation thereof. In addition, adjustment means are provided to vary the tension of the resilient membranes.

The invention will be better understood and additional objects and advantages will become apparent from the following description taken in connection with the accompanying drawing.

BRIEF DESCRIPTION OF THE DRAWINGS

FIG. 2 is a foreshortened top plan view of a crop catching floor embodying features of the present invention this view being taken on the line 2—2 of FIG. 1 but being turned 90 degrees from the FIG. 1 position.

FIG. 3 is an enlarged fragmentary and offset sectional view taken on the line 3—3 of FIG. 2;

FIG. 4 is a fragmentary plan view taken on the line 4—4 of FIG. 3;

FIG. 5 is a sectional view taken on the line 5—5 of FIG. 3;

FIG. 6 is a fragmentary elevational view taken on the line 6—6 of FIG. 2;

FIG. 7 is a fragmentary elevational view taken on the line 7—7 of FIG. 2;

FIG. 8 is a fragmentary bottom plan view taken on the line 8—8 of FIG. 3; and

FIG. 9 is a fragmentary plan view taken on the line 9—9 of FIG. 1.

DETAILED DESCRIPTION OF A PREFERRED EMBODIMENT

Figure 1:
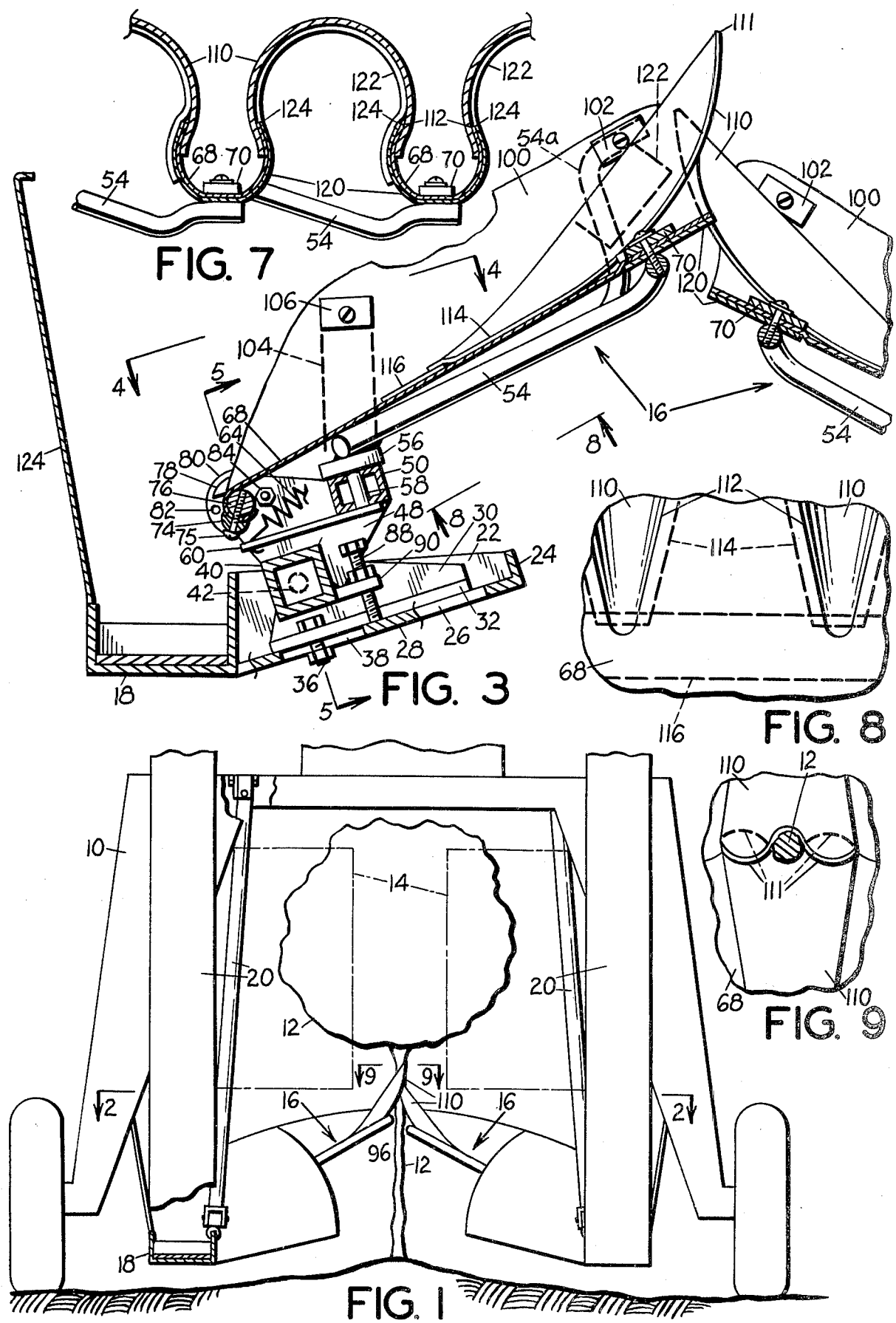
FIG. 1 is a fragmentary end elevational view of a harvesting machine of a type on which the present crop catching floor may be employed.

With reference first to FIG. 1, the invention is arranged for use with a harvesting machine 10 employing an enlarged frame having wheel support and being constructed in an inverted U-shape so as to move over vines or plants 12 in straddling relation. This type of machine employs shaker mechanism 14, or other crop removing means, arranged to engage the vines and remove crop articles so that such articles will fall by gravity onto a floor assembly. The present invention provides an improved floor assembly or catching means, designated generally by the numeral 16, arranged to catch the falling crop articles. This type of machine supports side conveyors 18, also shown in FIGS. 2 and 3, such conveyors being of conventional construction and being suspended from the frame of the machine by upright frame members 20.

The present crop catching floor is suitably secured to the machine and preferably is supported directly on the conveyor mechanisms 18. For this purpose, the catching floor comprises end brackets 22, FIGS. 2-4, secured to the conveyor mechanisms 18, as by welding or by integral casting, at each end of the floor and projecting inwardly. The two brackets on each side of the floor are interconnected by a longitudinal integral frame piece 24. A laterally extending reinforcing frame plate 26 is secured between the frame piece 24 and its respective conveyor 18 at about the longitudinal center of the floor. Bracket portions 22 have a bottom wall 28 on which is supported end brackets 30 having a bottom wall 32 seated on the bottom wall 28 of brackets 22. Brackets 30 are attached to the respective walls 28 by bolts 36 having secured adjustment in laterally elongated slots 38. By means of this bolted connection, the brackets 30 and associated structure are secured fixedly to brackets 22 but can be adjusted laterally.

Brackets 30 support a longitudinal rigid tubular frame member 40 by means of end stub shafts 42, FIG. 5, integral with the frame member 40 and rotatably supported in suitable apertures 44 in the brackets 30. Brackets 30 have a vertical extension 48 to which is integrated a longitudinal rigid bar 50 pivotally supporting a plurality of arms 54 on its top surface. The pivot connection of the arms 54 on the bar 50 comprises pivot pads 56 integral with the arms. These pads are rotatably supported on the top surface of bar 50 and have an integral shaft 58 extending downwardly through the bar 50 in a rotatable fit. The bottom ends of shafts 58 project below the botom of bar 50 and have arm extensions 60 secured rigidly thereto, these extensions projecting on the opposite side of the bar 50 from the arms 54. With reference to FIG. 4, bar 50 has stop lugs 62 secured adjacent to and arranged for engagement by pivot pads 56. Arms 54 are urged into a rest position as shown in FIG. 4 by tension springs 64 connected between the arm extensions 60 and the bar 50, these springs normally holding the pivot pads against their stop lugs 62. The arms 54 angle rearwardly relative to the direction of movement of the machine and terminate a short distance short of the center of the machine. This disposition of the arms is shown in FIG. 2 wherein the direction of movement of the machine is to the left. While the springs 64 maintain the arms 54 in their angled rest position against the stops 62, they allow pivotal movement of the arms against the action of springs 64 if necessary.

The arms 54 on each side support floor portions comprising resilient membranes or aprons 68 secured by means of connections 70, such as rivets, bolts, or the like to the outer or free ends of the arms 54. The other or outer edge of the membranes is connected as by slats 74 and screws 75, to a longitudinal rod 76 rotatably supported in bifurcated portions 78 of bracket extensions 48. At least one end of rod 76 has an integral disc 80, FIGS. 3 and 6, disposed on the outer side of extension 78, and such disc has a plurality of concentrically located apertures 82. An anchor bolt 84 is releasably secured in the extension 78 and is arranged for engagement in a selected aperture 82 for applying or varying the desired tension to the membranes 68.

The arms 54 are angled upwardly so that crop articles falling on the membranes will roll into the conveyors 18. The upward inclination of these arms is adjustable by means of an adjusting screw 88, FIGS. 3 and 4, threaded in an ear 90 projecting integrally from the frame member 40. The bottom end of adjusting screw 88 freely abuts against frame member 26, and upon threaded movement thereof in the ear 90, the frame member 40 can be pivotally adjusted on its stub shafts 42. The arms 54 and membrane portions 68 maintain their down rest position on the adjusting screw 88 by gravity.

The tip ends of arms 54 angle upwardly and rearwardly, FIGS. 2 and 3, and the membranes 68 extend from their rod connections 76 over the top of arms 54 and are secured in stretched relation to these tip ends by the connectors 70. Since the ends of arms 54 angle upwardly at their outer ends and since the membranes 68 are resilient, such membranes can be stretched by suitable rotatable adjustment of rod 76 to be spaced a short distance above the intermediate portion of the arms. This spanning relation provides a cushioned floor for falling crop articles.

The membranes 68 have a forward edge 94, FIG. 2, which leads laterally inwardly to the forwardmost arms 54. This edge then leads along its respective forwardmost arm and is held thereon by a sleeve 96 which serves not only to hold the leading edge of the membrane on the arm but if constructed of plastic or the like protects the vines from this leading portion of the machine as the latter starts to thread through such vines.

The rearward ends of the membranes 68 are turned up at 100, FIGS. 2, 3 and 5, to prevent crop articles from spilling out the back as the machine advances through the vines. For this purpose, the end portions 54a of the rearwardmost arms 54 extend upwardly a few inches and have a connection 102 with the upturned portion of the membranes. Support for the upturned ends 100 of the membranes at the outer side of the floor is by upright fingers 104 integral with vertical extensions 48 on the brackets 30, these fingers having a top connection 106 for securement to the membranes.

The membranes 68 have a specific structure designed for smooth threading through the trunks of the vines to prevent damage to the vines and for close wrapping around the vines to prevent crop articles from escaping downward in the area immediately adjacent to the vines. In such structure, the membranes have a plurality of laterally extending arched or inverted cup portions 110, FIGS. 1, 2 and 3, disposed in laterally aligned opposed pairs with the arched portions on one side extending under and into the opposite arched portion in an overlapping relation as best seen in FIG. 3. These arched portions have rounded inner ends 111.

In the formation of the membranes 68 and their arched portions 110, V-shaped slots 112, FIG. 8, are cut so as to extend from the inner edge of the membranes to a point short of the outer secured edges at rods 76, and the arched portions 110 are formed by securing, such as by adhesive or other adequate means, a piece of resilient material over the slot 112. The material for the arched portions 110 is shaped as shown substantially in FIG. 2 but of a greater width than the slot so that such piece of material can be arched when applied. As best seen in FIG. 8, the arched portions are secured along side areas 114 of the slots. A longitudinal reinforcing strip 116 of resilient material is secured along the membranes at the closed ends of slots 112 to prevent the resilient material of the membranes from tearing in this area.

As best seen in FIGS. 3 and 7, a small reinforcing patch 120 is contained between the membranes 68 and the arms 54 in the area of the connections 70. In addition, a reinforcing base patch 122 is secured under the arched portion 110 and has a dimension to extend between the ends 124 of the reinforcing patches 124 and the sides of slots 112 or to cover such ends and slot edges. The base patches 122, in addition to providing lateral reinforcement for the membranes 68, provide a reinforced rub surface for said membranes as the arched portions pass through vines.

In the operation of the present catching floor, the machine moves to the left (FIG. 2). With skillful operation of the machine, it will straddle the vines so that the latter are engaged only by the areas of the arched portions 110, FIG. 3, that extend beyond the arms 54. Since the arms 54 are spring loaded, however, they will pivot rearwardly in the event the machine is not exactly centered over the vines. In this latter instance, the sleeves 96 on the forwardmost arms 54 engage the vines first and do not inflict any material damage on said vines.

As the machine moves through the vines, the trunk of the vines is engaged by the arched portions 110. In view of the resiliency of these arched portions and the rounded end configuration thereof, the trunk of the vines will be substantially surrounded at all times by a combination of the two end areas of the arched portions 110. This almost complete surrounded relation of the trunk of the vine 12 is shown in detail in FIG. 9, wherein although the upper arched portion 110 will be distorted in the one lateral direction, the lower arched portion 110 (shown in broken lines) is distorted in the other lateral direction. This arrangement provides a snug engagement completely around the trunk of the vines, and crop articles thus cannot fall to the ground through this area. In the structural arrangement of the resilient membrane and the arched portions, pairs of arched portions 110 or arms 54 are not disturbed by the operation of adjacent pairs of arched portions, thus providing the efficient catching floor as described.

Crop articles that fall on the present catching floor are thus caught without damage thereto. In addition, such catching floor moves efficiently through the vines throughout damage to the vines and without losing crop articles in the area around the trunk of the vines. Outer upright side flanges 124, FIG. 3, may if necessary be secured on the outer sides of the conveyors 18 to prevent crop articles from moving laterally beyond the conveyor.

It is to be understood that the form of my invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A crop catching floor for harvesting machines of the type having a main frame arranged to move along the ground in straddling relation to vines and also having crop removing means arranged to remove crop articles from such vines, said catching floor comprising
   (a) a pair of opposite side frame means having forward and rearward ends and arranged to be secured to a harvesting machine,
   (b) a pair of opposite floor panels secured to said side frame means for catching falling crop articles removed by the crop removing means,
   (c) said floor panels extending inwardly from respective ones of said side frames and having free end portions in overlapping relation with each other,
   (d) each of said floor panels comprising a resilient membrane,
   (e) support means on said side frames extending under said membranes and connected thereto to hold said membranes in their overlapping relation,
   (f) said membranes being movable through vines at their overlapping portion by resilient distortion thereof whereby to pass by the trunk portions of vines in close association therewith and catch crop articles falling by gravity which have been removed by the crop removing means,
   (g) and adjustment means associated with said support means arranged to adjust the inclination thereof.

2. A crop catching floor for harvesting machines of the type having a main frame arranged to move along the ground in straddling relation to vines and also having crop removing means arranged to remove crop articles from such vines, said catching floor comprising
   (a) a pair of opposite side frame means having forward and rearward ends and arranged to be secured to a harvesting machine,
   (b) a pair of opposite floor panels secured to said side frame means for catching falling crop articles removed by the crop removing means,
   (c) said floor panels extending inwardly from respective ones of said side frames and having free end portions in overlapping relation with each other,
   (d) each of said floor panels comprising a resilient membrane,
   (e) support means on said side frames extending under said membranes and connected thereto to hold said membranes in their overlapping relation,
   (f) said membranes being secured between opposite ends of said support means,
   (g) and adjustment means on said support means arranged to vary the tension of said membranes,
   (h) said membranes being movable through vines at their overlapping portion by resilient distortion thereof whereby to pass by the trunk portions of vines in close association therewith and catch crop articles falling by gravity which have been removed by the crop removing means.

3. A crop catching floor for harvesting machines of the type having a main frame arranged to move along the ground in straddling relation to the vines and also having crop removing means arranged to remove crop articles from such vines, said catching floor comprising
   (a) a pair of opposite, longitudinally extending side frames,
   (b) a row of longitudinally spaced arms extending laterally inwardly from each of said side frames,
   (c) a resilient crop catching membrane supported on and secured to respective rows of said arms and terminating centrally of the floor in overlapping relation,
   (d) said arms being pivotally supported on said side frames on an upright axis for swinging movement longitudinally of said floor between a forward position comprising a normal rest position of said membranes and a retracted position comprising a distorted position of said membranes,
   (e) and spring means connected between said arms and said side frames for urging said arms to their said forward position,
   (f) said membranes being arranged to be movable through vines at their overlapping portion by resilient distortion thereof as well as by pivotal movement of said arms and being arranged to return to said normal rest position by their own resiliency and by the spring return of said arms whereby to pass by the trunk portions of vines in close association therewith and catch crop articles falling by gravity which have been removed by crop removing means.

4. The crop catching floor of claim 3 wherein said membranes include a plurality of arched portions having their axes extending laterally, the arched portions of opposite membranes being in laterally overlapped relation and providing sufficient slack in said membranes for ready return from their distorted position to their rest position.

5. The crop catching floor of claim 4 wherein the arched portions of opposite membranes are laterally aligned.

6. The crop catching floor of claim 3 wherein said membranes have an upturned rearward end to prevent crop articles from falling out the rearward end of said floor panels.

* * * * *